US012340012B2

(12) United States Patent
Okamoto

(10) Patent No.: US 12,340,012 B2
(45) Date of Patent: Jun. 24, 2025

(54) OPERATION DETECTION DEVICE AND OPERATION DETECTION METHOD

(71) Applicant: Nissan Motor Co., Ltd., Kanagawa (JP)

(72) Inventor: Masaki Okamoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 7 days.

(21) Appl. No.: 18/566,893

(22) PCT Filed: Jun. 4, 2021

(86) PCT No.: PCT/JP2021/021381
§ 371 (c)(1),
(2) Date: Dec. 4, 2023

(87) PCT Pub. No.: WO2022/254693
PCT Pub. Date: Dec. 8, 2022

(65) Prior Publication Data
US 2024/0272704 A1 Aug. 15, 2024

(51) Int. Cl.
*G06F 3/01* (2006.01)
*G06F 3/16* (2006.01)

(52) U.S. Cl.
CPC ............. *G06F 3/011* (2013.01); *G06F 3/017* (2013.01); *G06F 3/167* (2013.01); *G06F 2203/0381* (2013.01)

(58) Field of Classification Search
CPC .......... G06F 3/011; G06F 3/017; G06F 3/167; G06F 2203/0381
See application file for complete search history.

(56) References Cited

U.S. PATENT DOCUMENTS

2009/0051648 A1 2/2009 Shamaie et al.
2009/0052785 A1 2/2009 Shamaie
(Continued)

FOREIGN PATENT DOCUMENTS

JP 2013-232208 A 11/2013
JP 2015-088161 A 5/2015
(Continued)

*Primary Examiner* — Kenneth B Lee, Jr.
(74) *Attorney, Agent, or Firm* — Osha Bergman Watanabe & Burton LLP

(57) ABSTRACT

An operation detection device includes a motion detection unit that detects a motion of an operator; a certainty level estimation unit; a sounds detection unit; and an operation determination unit. The certainty level estimation unit estimates a certainty level at predetermined time intervals based on the motion of the operator detected by the motion detection unit and acquires the certainty level with respect to a change in the motion. The certainty level indicates that the operator has performed a predetermined operation. The sound detection unit detects a predetermined sound generated from an operation object operated by the operator or an physical body accompanying the operation object when the predetermined operation is performed. The operation determination unit, when the predetermined sound is detected by the sound detection unit while the certainty level estimated by the certainty level estimation unit is a predetermined value or more and the predetermined sound is detected by the sound detection unit, determines that the operator has performed the predetermined operation, and when the predetermined sound is not detected by the sound detection unit while the certainty level is the predetermined value or more, determines that the predetermined operation has not been performed in a predetermined procedure.

7 Claims, 7 Drawing Sheets

(56) References Cited

U.S. PATENT DOCUMENTS

| | | | |
|---|---|---|---|
| 2015/0089455 A1 | 3/2015 | Yamada | |
| 2015/0091790 A1* | 4/2015 | Forutanpour | G06F 3/011 |
| | | | 345/156 |
| 2015/0339100 A1 | 11/2015 | Miura | |
| 2016/0089743 A1* | 3/2016 | Dunahoo | B23K 9/0956 |
| | | | 219/125.1 |
| 2020/0125067 A1* | 4/2020 | Wind | G05B 19/4093 |
| 2022/0142596 A1* | 5/2022 | Yoshida | G06F 3/0334 |
| 2023/0054236 A1* | 2/2023 | Rodriguez Bravo | |
| | | | G02B 27/0172 |

FOREIGN PATENT DOCUMENTS

| | | |
|---|---|---|
| JP | 2017-162126 A | 9/2017 |
| JP | 2018-081697 A | 5/2018 |
| WO | 2014/147785 A1 | 9/2014 |

\* cited by examiner

Step (1)

Step (2)

Step (3)

Step (4)

Step (1)

Step (2)

Step (3)

Step (4)

OPERATION DETECTION DEVICE AND OPERATION DETECTION METHOD

TECHNICAL FIELD

The present invention relates to a detection device and a detection method for detecting an operation performed by an operator.

BACKGROUND ART

A technique of determining the operation content to a component to be a user interface (UI component) is known, which includes displaying the UI component on an operation plane on which a user (operator) performs an operation, detecting a touch position at which the user's finger touches the operation plane, acquiring the shape of the user's hand including the finger which touches the operation plane, recognizing from the acquired shape of hand a projection area when the hand is projected on the operation plane, detecting the user's operation to the UI component from the detected touch position and the position at which the UI component is displayed, and determining the operation content to the UI component in accordance with the recognized projection area and the detected user's operation to the UI component (Patent Document 1).

PRIOR ART DOCUMENT

Patent Document

Patent Document 1: JP2017-162126A

SUMMARY OF INVENTION

Problems to be Solved by Invention

In the above prior art, when detecting the operator's operation to the UI component, the detected operator's touch position is used. There is therefore a problem in that if the touch position cannot be detected, the operator's operation to the UI component cannot be detected, and the user's operation content to the UI component cannot be appropriately determined.

A problem to be solved by the present invention is to provide an operation detection device and an operation detection method that are able to improve the detection accuracy of the operator's operation when the operator's touch position cannot be detected.

Means for Solving Problems

The present invention solves the above problem through acquiring an image including an operator, detecting a motion of the operator from the acquired image, estimating a certainty level at predetermined time intervals based on the detected motion of the operator to acquire the certainty level with respect to a change in the motion, the certainty level indicating that the operator has performed a predetermined operation, detecting a predetermined sound generated from an operation object operated by the operator or an physical body accompanying the operation object when the predetermined operation is performed; when the predetermined sound is detected while the certainty level is a predetermined value or more, determining that the operator has performed the predetermined operation, and when the predetermined sound is not detected while the certainty level is the predetermined value or more, determining that the predetermined operation has not been performed in a predetermined procedure.

Effect of Invention

According to the present invention, when the operator's touch position cannot be detected, the detection accuracy of the operator's operation can be improved.

MODE(S) FOR CARRYING OUT THE INVENTION

Hereinafter, one or more embodiments of the operation detection device and operation detection method according to the present invention will be described with reference to the drawings.

Operation Detection System

Figure 1:
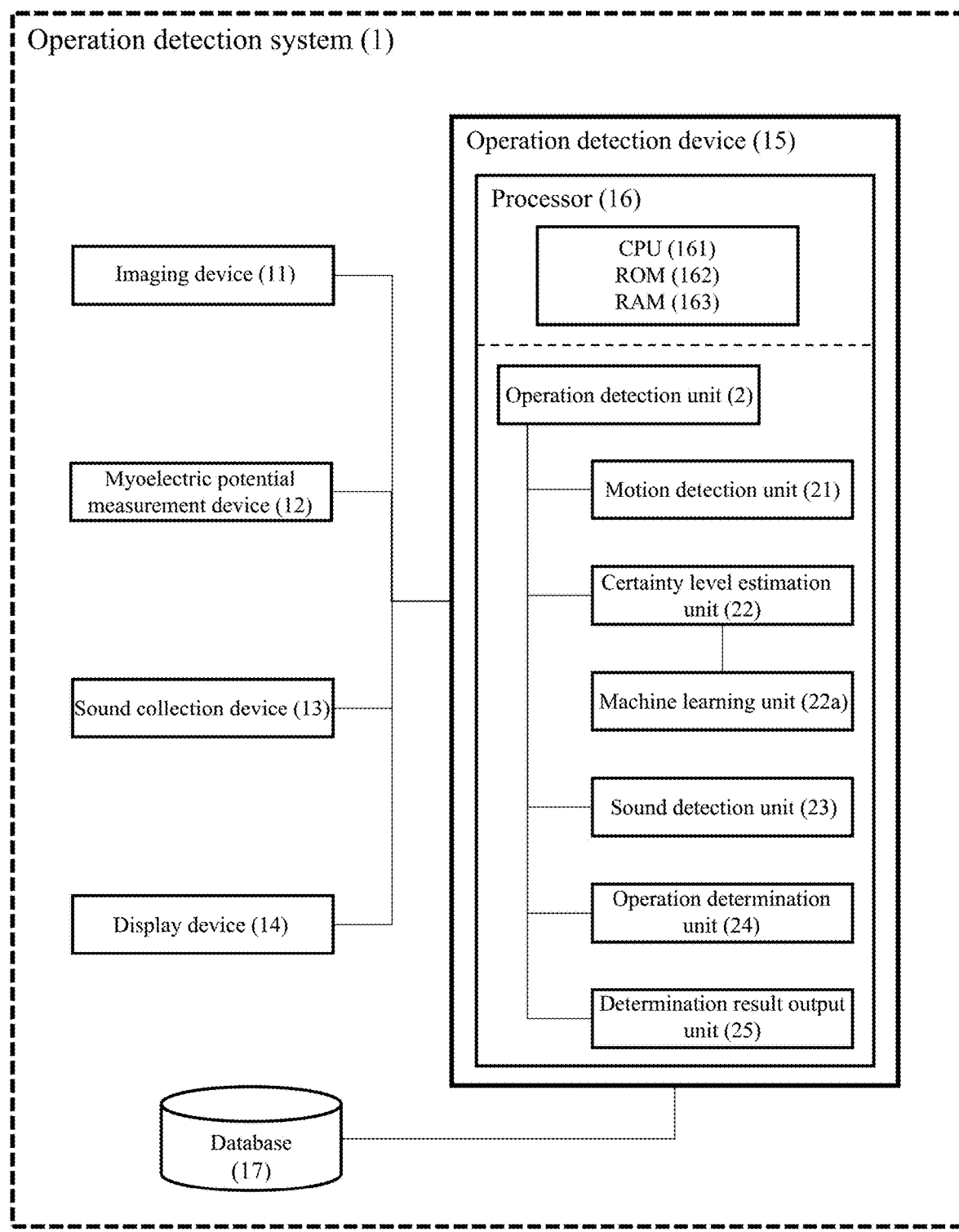
FIG. 1 is a block diagram illustrating one of embodiments of an operation detection system including an operation detection device according to the present invention.

FIG. 1 is a block diagram illustrating an operation detection system 1 according to the present invention. The operation detection system 1 is an apparatus that detects an operator's operation on a certain device, and can be used, for example, such as when detecting an operation of onboard equipment performed by occupants of a vehicle (including the driver, here and hereinafter) and developing a function associated with the operation, when detecting whether or not the work of a worker engaged in assembly work has been carried out in accordance with a predetermined procedure in a vehicle assembly factory, or when confirming whether or not the work of a mechanic engaged in maintenance of a vehicle has been carried out in accordance with a manual in a vehicle dealership (also referred to as a "dealer," hereinafter). The operator whose operation is detected by the operation detection system 1 (also simply referred to as an "operator," hereinafter) is not particularly limited, and examples of the operator include occupants of vehicles, workers of factories, and mechanics of dealers.

As illustrated in FIG. 1, the operation detection system 1 includes an imaging device 11, a myoelectric potential measurement device 12, a sound collection device 13, a display device 14, and an operation detection device 15. The devices constituting the operation detection system 1 are connected to each other by known means such as wired or wireless LAN in a state in which they can mutually exchange data. The numbers of imaging devices 11, myoelectric potential measurement devices 12, sound collection devices 13, and display devices 14 are not particularly limited, provided that they are each at least one. The imaging device 11, myoelectric potential measurement device 12, sound collection device 13, and display device 14 do not need to be provided together with the operation detection device 15, and may be installed at a location away from the operation detection device 15. For example, the imaging device 11, sound collection device 13, and display device 14 may be installed near an assembly line in an assembly factory while the operation detection device 15 may be installed in a central control room away from the assembly line or in a server at a remote location away from the assembly factory.

The imaging device 11 is a device for acquiring image data of objects present around the operator. Examples of the imaging device 11 include cameras such as a camera equipped with an imaging element such as a CCD, an ultrasonic camera, and an infrared camera. The objects include, in addition to the operator, physical bodies present around the operator. For example, the objects include switches and touch panels present around the occupants of a vehicle, parts assembled by a worker and tools used by the worker, and vehicles maintained by the mechanics of a dealer. The imaging device 11 is installed at a location from which it can detect the operator's motion, such as on the dashboard, roof, and seat of a vehicle, near an assembly line, a workbench, and a tool used by a worker in an assembly factory, or on a lift of a dealer.

The myoelectric potential measurement device 12 is a device for measuring the myoelectric potential of the operator and may be, for example, an electromyograph. The type of the myoelectric potential measurement device 12 is not particularly limited and may be, for example, any of an electromyograph equipped with needle electrodes, an electromyograph equipped with surface electrodes, or an electromyograph equipped with wire electrodes. The myoelectric potential measurement device 12 is attached to the operator's body, for example, using a pressure-sensitive adhesive pad or a hook-and-loop fastener and measures the myoelectric potential at a portion that is in contact with the operator's body to which the myoelectric potential measurement device 12 is attached. Examples of the sites of the operator to which the myoelectric potential measurement device 12 is attached include the arm of a vehicle occupant, the upper arm and/or forearm of a worker, and the leg of a dealer mechanic.

The sound collection device 13 is a device for acquiring surrounding sounds as audio data. For example, the sound collection device 13 is a microphone such as a stand microphone, a close-talk type microphone, or a gun microphone. The microphone may be omnidirectional or directional. The communication scheme may be any of wired and wireless. The sounds acquired by the sound collection device 13 include, in addition to the operator's voice and the voices of people around the operator, sounds caused by the operator's operation. Examples of the sounds caused by the operator's operation include sounds generated from a switch operated by a vehicle occupant, sounds generated from a speaker when a vehicle occupant touches a touch panel, sounds generated when a worker fit two or more parts together to interlock them, and operation sounds of tools being used by a dealer mechanic. The sound collection device 13 is installed at a location from which it can detect the sounds around the operator, such as on the dashboard, roof, and seat of a vehicle or an assembly line, a workbench, and a tool used by a worker in an assembly factory. The sound collection device 13 may be installed together with the imaging device 11 or the myoelectric potential measurement device 12.

The display device 14 is a device for notifying the operator of the operation detected by the operation detection device 15. The display device 14 is, for example, a liquid crystal display, a projector, or the like and may include a speaker. The display device 14 is installed at a location near the operator at which it can notify the operator of necessary information, such as on the dashboard of a vehicle or at a worker's work place in an assembly factory, but when there is a supervisor to monitor the operator's operation, the display device 14 may be located near the supervisor. In this case, if the supervisor is located away from the operator, the display device 14 will be installed at a location away from the operator. The display device 14 may be attached to the operator as a wearable terminal. Additionally or alternatively, the imaging device 11, myoelectric potential measurement device 12, sound collection device 13, display device 14, and operation detection device 15 may be integrated into one wearable terminal, which may be attached to the operator. Instead of the display device 14, only a speaker that emits an alarm sound may be used.

Figure 2:
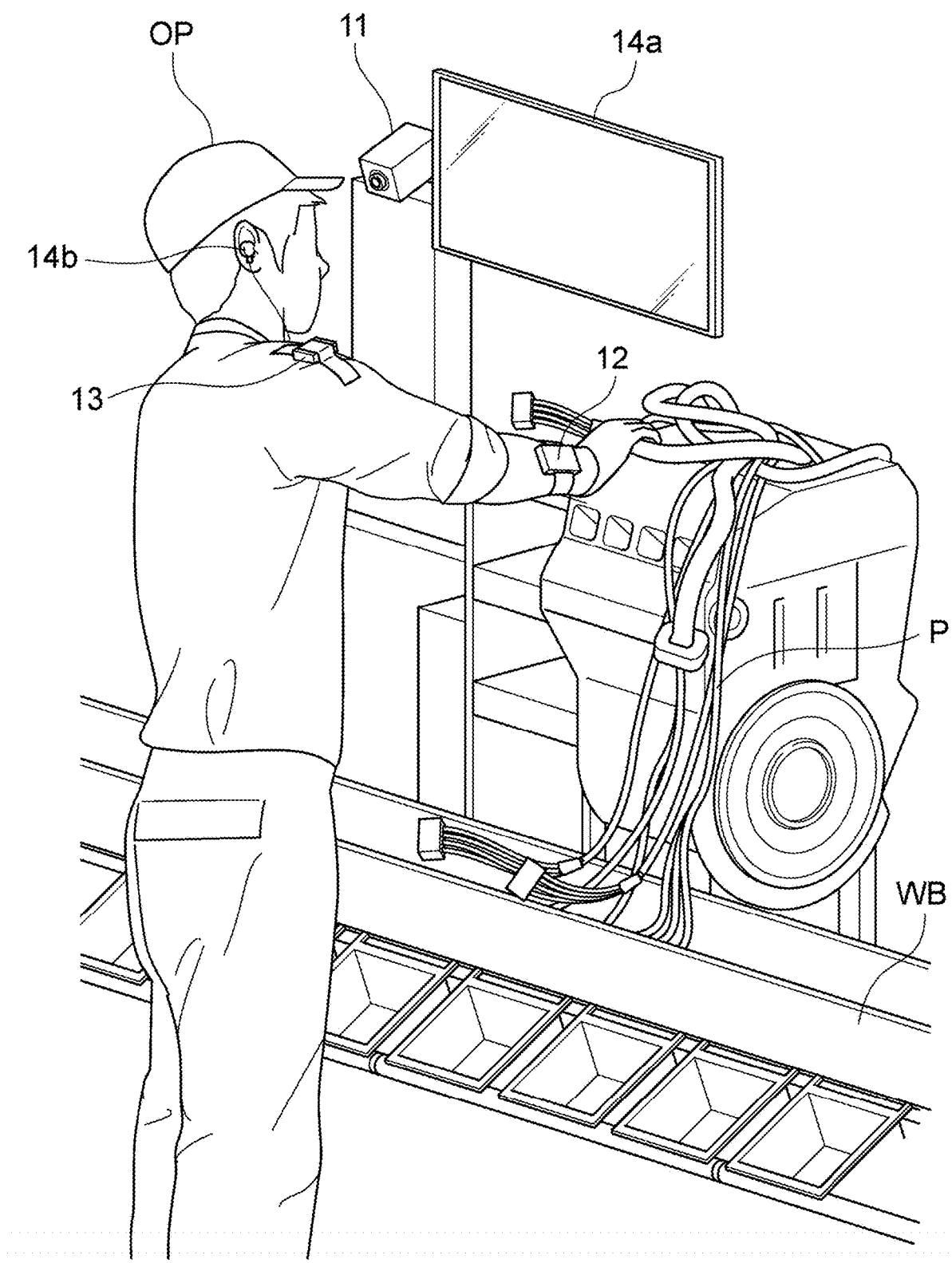
FIG. 2 is a perspective view illustrating an example of the positional relationship between the imaging device, myoelectric potential measurement device, sound collection device, and display device of FIG. 1 and an operator.

FIG. 2 illustrates an example of the positional relationship between the imaging device 11, myoelectric potential measurement device 12, sound collection device 13, and display device 14 and the operator. In FIG. 2, it is assumed that operator OP is a worker engaged in assembly work in an assembly factory and is assembling parts P on a workbench WB. The imaging device 11 is installed above the operator OP and acquires as image data the state of assembling the parts P performed by the operator OP on the workbench WB. The myoelectric potential measurement device 12, which is attached to the right forearm of the operator OP, acquires the muscle movements of the operator OP when assembling the parts P from the measured myoelectric potential value and detects the motion of the operator OP. The sound collection device 13, which is attached to the right upper arm of the operator OP, detects the sounds of parts interlocking, etc. generated when the operator OP assembles the parts P. The display device 14, which notifies the operator OP of the detected operation, is installed as a liquid crystal display 14a, for example, in front of the operator OP. Alternatively, it may be provided as an earphone 14b attached to an ear of the operator OP.

Referring again to FIG. 1, the operation detection device 15 is a device for determining whether or not the operator has performed a certain operation. The image data, myoelectric potential data, and audio data used for the determination are acquired from the imaging device 11, myoelectric potential measurement device 12, and sound collection device 13, respectively, at predetermined time intervals. The operation detection device 15 uses a processor 16 to achieve functions such as processing the acquired data, determining whether or not the operation has been appropriately performed, and outputting the result of the determination. The processor 16 includes a ROM (Read Only Memory) 162 that stores programs, a CPU (Central Processing Unit) 161 as an operating circuit that executes the programs stored in the ROM 162 thereby to serve as the operation detection device 15, and a RAM (Random Access Memory) 163 that serves as an accessible storage device.

Operation Detection Unit

The programs used in the operation detection device 15 of the present embodiment include an operation detection unit 2 that is a functional block for the operation detection device 15 to achieve some functions such as processing the acquired data, determining whether or not the operation has been appropriately performed, and outputting the result of the determination. The operation detection unit 2 has functions of acquiring the image data from the imaging device 11, acquiring the myoelectric potential values from the myoelectric potential measurement device 12, acquiring the audio data from the sound collection device 13, estimating, based on the acquired data, the operation performed by the operator, determining whether or not the estimated operation has been appropriately performed, and outputting the determination result. As illustrated in FIG. 1, the operation detection unit 2 includes a motion detection unit 21, a certainty level estimation unit 22, a sound detection unit 23, an operation determination unit 24, and a determination result output unit 25. For descriptive purposes, these units are extracted and illustrated in FIG. 1.

The operation detection device 15 illustrated in FIG. 1 includes all of the above functional blocks, but it is not necessary for the single operation detection device 15 to include all the functional blocks, and some of the above functional blocks may be provided in other equipment included in the operation detection system 1 or in another information processing device (not illustrated). For example, in the operation detection system 1 of FIG. 1, the determination result output unit 25 may be provided in the display device 14. In this case, the functions of the determination result output unit 25 will be executed using the CPU, ROM, and RAM of the display device 14.

It is also not necessary to execute all the processes of respective functional blocks in a single device, and the functions of respective functional blocks may be achieved across two or more devices connected in a state in which data can be exchanged. For example, in the operation detection system 1 of FIG. 1, some of the processes to be executed in the motion detection unit 21 may be executed in the imaging device 11 or the myoelectric potential measurement device 12, and the remaining processes may be executed in the operation detection device 15. In this case, some of the processes for achieving the functions of the motion detection unit 21 will be executed using the CPU, ROM, and RAM of the imaging device 11 or the myoelectric potential measurement device 12. In another embodiment, some of the processes executed in the sound detection unit 23 may be performed in the sound collection device 13, and the remaining processes may be performed in the operation detection device 15.

The functions achieved by respective functional blocks of the operation detection unit 2 will be described below.

The motion detection unit 21 has a function of detecting the motion of an operator. The motion detection unit 21 acquires, for example, image data including the operator from the imaging device 11 and detects the operator's motion from the acquired image data. The motion detection unit 21 performs analysis such as pattern matching on the image data acquired from the imaging device 11 and classifies the objects included in the image data. Next, the motion detection unit 21 selects an operator from the classified objects and acquires data regarding the operator extracted from the image data. Then, from the data regarding the operator, the motion detection unit 21 recognizes sites of the operator's body and their positional relationships and detects the operator's motion from the recognized positional relationships of the sites.

Alternatively or in addition to this, the motion detection unit 21 may acquire the measured myoelectric potential value from the myoelectric potential measurement device 12 and detect the operator's motion from the acquired myoelectric potential value. For example, the myoelectric potential measurement device 12 is attached to an arm of a worker working on an assembly line in a factory, and the potential of each muscle in the upper arm and forearm of the worker's arm is measured. Then, from the measured potential of each muscle, it is detected as the motion which muscles are contracting, that is, how the worker's arm is moving.

The certainty level estimation unit 22 has a function of estimating, based on the operator's motion detected by the motion detection unit 21, the certainty level that the operator has performed a predetermined operation. The predetermined operation is not particularly limited, and examples of the predetermined operation include any of operations for the operator to make some kind of input to the operation object. Specifically, examples of the predetermined operation include an operation for a vehicle occupant to press a switch that raises or lowers the vehicle's window glass, an operation for a vehicle occupant to touch a touch panel to change the map display on a navigation device, an operation for an assembly factory worker to fit a coupler connected to a sensor with a coupler connected to an electronic control unit (ECU), an operation for an assembly factory worker to tighten bolts using a tool to attach an exhaust manifold to an engine block, an operation for a dealer mechanic to fit a spark plug into an engine, and an operation for a dealer mechanic to tighten bolts using a torque wrench.

When estimating the certainty level that a predetermined operation has been performed, the certainty level estimation unit 22 estimates, based on the operator's motion detected by the motion detection unit 21, the operation that the operator is about to perform. Here, the correspondence relationship between the operator's motion and the operation that the operator is about to perform is preliminarily obtained for each operation and is stored, for example, in a database such as a database 17. The certainty level estimation unit 22 can acquire the correspondence relationship between an operation and a motion from the database 17 as necessary. The certainty level estimation unit 22 estimates, based on the correspondence relationship obtained from the database 17, the operation that the operator is about to perform from the operator's motion.

As an example, when the motion detection unit 21 detects the motion of an occupant sitting in the front passenger seat of a vehicle wiping sweat from his/her face with a handkerchief and then extending his/her hand to a switch installed in the door on the front passenger seat side, the certainty level estimation unit 22 searches for an operation corresponding to the motion of extending the hand to the switch installed on the door on the front passenger seat side from the correspondence relationship between a motion and an operation acquired from the database 17. Assuming that the operation corresponding to the motion is an operation of pulling the handle on the front passenger seat side door to open the door or an operation of pressing a switch that raises or lowers the vehicle's window glass, the certainty level estimation unit 22 estimates that the occupant's motion corresponds to the operation of pressing the switch that raises or lowers the vehicle's window glass because the vehicle is traveling and the occupant is wiping sweat from his/her face with a handkerchief.

As another example, when the motion detection unit 21 detects the motion of a worker working on a factory assembly line extending the right hand to a coupler in a state of holding an unfitted coupler in the left hand, the certainty level estimation unit 22 searches for an operation corresponding to the motion of extending the hand to the coupler from the correspondence relationship between a motion and an operation acquired from the database 17. Assuming that the operation corresponding to the motion is an operation of pulling out one coupler from a pair of couplers that are already fitted or an operation of fitting a coupler connected to a sensor with a coupler connected to an electronic control device, the certainty level estimation unit 22 estimates that the worker's motion corresponds to the operation of fitting a coupler connected to a sensor with a coupler connected to an electronic control device because the worker is holding the unfitted coupler in the left hand.

The certainty level estimation unit 22 determines whether or not the operation estimated as described above corresponds to a predetermined operation. Then, when determining that the estimated operation corresponds to the predetermined operation, the certainty level estimation unit 22 estimates a certainty level that is the probability that the predetermined operation has been performed. The certainty level is preliminarily determined for each predetermined operation as a function for the operator's motion and is stored, for example, in a database such as the database 17. The certainty level estimation unit 22 can acquire from the database 17 the certainty level that the predetermined operation has been performed for the detected motion, as necessary. For example, in the case of an operation of touching a touch panel to change the display of a device, the certainty level is highest when detecting the motion of the passenger's hand touching the touch panel, and the certainty level decreases as the passenger's hand moves away from the touch panel. In the case of an operation of pressing a switch, the certainty level is highest when detecting the motion of the passenger's hand touching the switch as the motion, and the certainty level decreases as the passenger's hand moves away from the switch.

As another example, in the case of an operation of fitting two couplers, the certainty level is highest when the engaged couplers stop moving and the motion of the worker's hand stopping is detected as the motion, and the certainty level decreases as the distance between the couplers increases. In the case of an operation of tightening bolts using a tool such as a torque wrench, the certainty level is highest when the torque wrench stops moving and the motion of the worker's hand stopping is detected as the motion, and the certainty level is low while the torque wrench is rotating and after the torque wrench stops. In the case of an operation of fitting a spark plug into an engine, the certainty level is highest when the spark plug stops rotating and the motion of the worker's hand stopping is detected as the motion, and the certainty level is low while the hand is moving and after the mechanic's body moves away from the engine.

Such estimation of the certainty level is performed in parallel with the detection of the operator's motion by the motion detection unit 21, and the certainty level estimation unit 22 estimates the certainty level every time the operator's motion changes. The certainty level estimation unit 22 can estimate the certainty level at predetermined time intervals, and the predetermined time can be set as an appropriate time depending on the computational performance of the CPU 161.

Additionally or alternatively, the certainty level estimation unit 22 can estimate the certainty level using a learned model that has undergone machine learning for estimating the certainty level from the operator's motion detected by the motion detection unit 21. The learned model refers to a model that has preliminarily learned by machine learning so that appropriate output data can be obtained for certain input data. The learned model includes at least programs that perform calculations to obtain output data from input data and weighting coefficients (parameters) used in the calculations. When the operator's motion detected by the motion detection unit 21 is input as the input data, the learned model of the present embodiment allows a computer (in particular, the CPU 161 of the processor 16) to output, based on the input data, the output data including the operation corresponding to the operator's motion and the certainty level that the operation has been performed. By using such a learned model, even for operations that are not preliminarily set, it is possible to estimate the certainty level that an operation has been performed.

Figure 3:
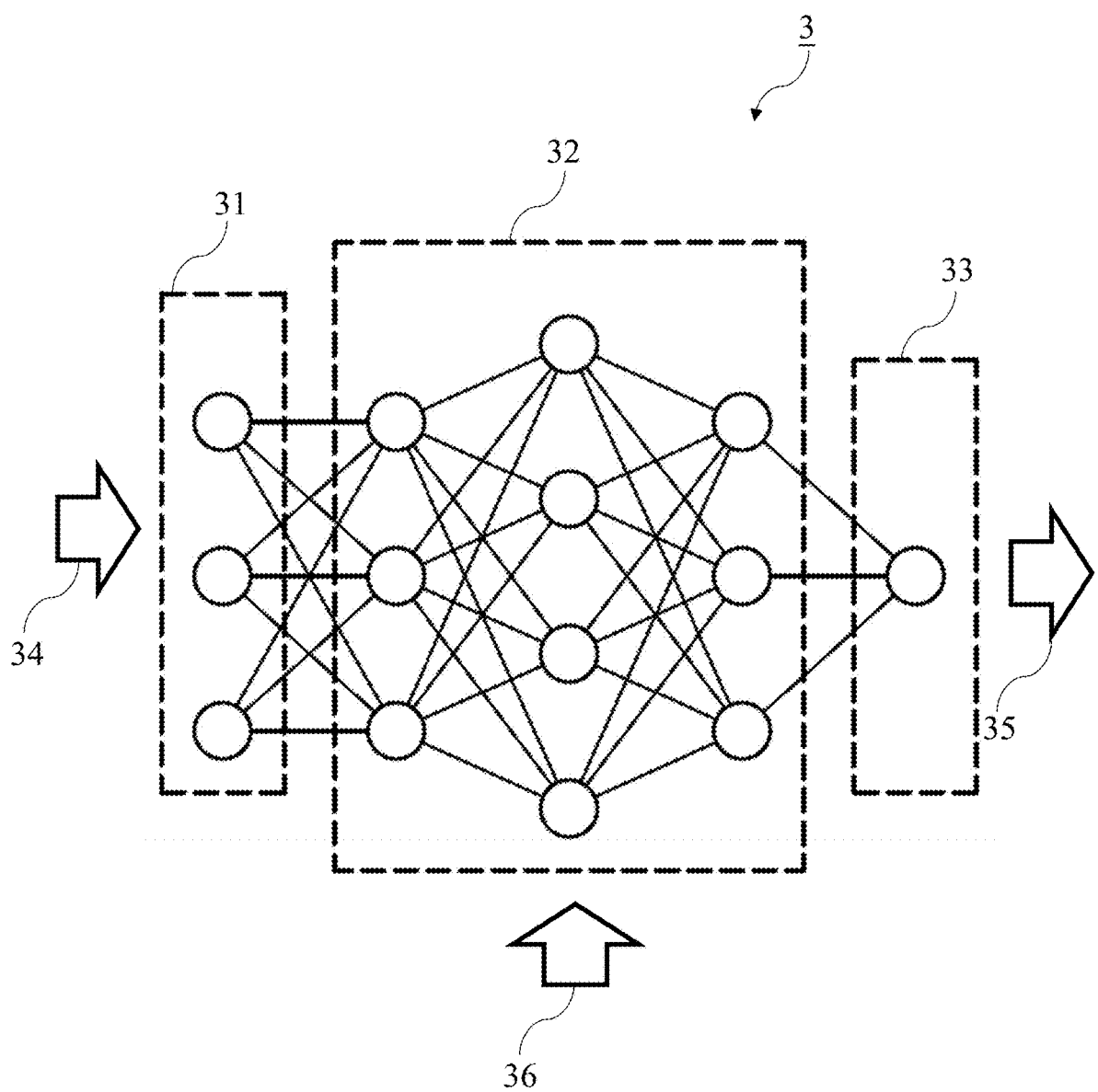
FIG. 3 is an explanatory diagram illustrating an example of a learned model used in a certainty level estimation unit of FIG. 1.

The learned model of the present embodiment is not particularly limited, but may be, for example, a neural network 3 as illustrated in FIG. 3. The neural network 3 includes an input layer 31, an intermediate layer 32, and an output layer 33, and each layer includes at least one neuron. Input data 34 including data on the operator's motion detected by the motion detection unit 21 is input to the input layer 31, and the input data is output to the intermediate layer 32. The intermediate layer 32 extracts motion data from the data input from the input layer 31. Next, the motion in the extracted motion data is associated with an operation. Then, when the operation is a predetermined operation, the certainty level that the predetermined operation has been performed for the motion is estimated. The output layer 33 outputs the data input from the intermediate layer 32 as output data 35 including data on the certainty level.

In the intermediate layer 32, the machine learning has established the correspondence relationship as to which operation corresponds to the motion of a vehicle occupant extending a hand to a switch installed in a door, the motion of a vehicle occupant extending a hand to an operator interface of onboard equipment, the motion of a factory worker extending the right hand to a coupler in a state of holding another coupler in the left hand, or the motion of a factory worker holding a torque wrench in the right hand and fitting the torque wrench with a bolt of an engine block on a workbench. This correspondence relationship is associated with a plurality of factors such as tools used by the operator and environments around the operator in addition to the positional relationships of sites of the operator's body in the detected motion, and parameters are set so that an appropriate operation is output for the detected motion. For example, the situation in which the vehicle with an occupant onboard is traveling, the situation in which a worker is holding couplers with both the right and left hands, etc. are taken into consideration as the parameters when estimating the operation from the motion.

The correspondence relationship in the above-described intermediate layer 32 may be preliminarily learned by machine learning, but may be newly learned with training data 36 that includes the input data 34 input to the neural network 3 in past times and the output data 35 output from the neural network 3 in past times, or may also be further learned with a learned model that is preliminarily learned by machine learning. The learning is executed by a machine learning unit 22a included in the certainty level estimation unit 22. The training data 36 is stored, for example, in a database such as the database 17 illustrated in FIG. 1 and can be acquired as necessary. By learning using the combination of the past input data 34 and output data 35, the certainty level estimation unit 22 can more accurately estimate the certainty level based on the motion.

Referring again to FIG. 1, the sound detection unit 23 has a function of detecting a predetermined sound generated when performing a predetermined operation. The predetermined sound is not particularly limited, and examples of the predetermined sound include any of sounds generated from the operation object operated by an operator in the predetermined operation and an physical body accompanying the operation object. Specifically, when the predetermined operation is an operation of pressing a switch, the predetermined sound is the operation sound of the switch generated when the switch is pressed. When the predetermined operation is an operation on a touch panel, the predetermined sound is a sound generated from a speaker when the touch panel is touched. When the predetermined operation is an operation of fitting couplers together, the predetermined sound is a sound generated when the fitting portions of the couplers are engaged. When the predetermined operation is an operation of tightening a bolt using a preset-type torque wrench that generates sound and vibration when the specified torque is reached, the predetermined sound is a sound generated when the torque wrench reaches the specified torque. The predetermined sound corresponding to the predetermined operation is stored in a database such as the database 17 as data such as waveform data, and can be acquired as necessary.

The sound detection unit 23 determines whether or not the audio data acquired from the sound collection device 13 includes the predetermined sound as described above. Specifically, the sound detection unit 23 performs processing on the audio data acquired from the sound collection device 13 to reduce noises such as road noise, engine sound, factory noise, and human speaking voice. Then, the sound detection unit 23 performs frequency analysis or the like to detect the same sound as the predetermined sound, which is acquired from the database 17, from the audio data that has been subjected to necessary preprocessing such as noise reduction. When the same sound as the predetermined sound is detected from the preprocessed audio data, the sound detection unit 23 outputs to the operation determination unit 24 that the predetermined sound has been detected. The correspondence relationship between the predetermined operation and the predetermined sound may not necessarily be one-to-one relationship, and two or more predetermined sounds may be set for one predetermined operation.

The operation determination unit 24 has a function of combining the certainty level estimated by the certainty level estimation unit 22 and the timing at which the predetermined sound is detected by the sound detection unit 23 to determine whether or not the predetermined operation has been performed, that is, whether or not the predetermined operation has been performed in a predetermined procedure. The predetermined procedure refers to an operation procedure that is preliminarily set for the predetermined operation. Specifically, when the certainty level estimated by the certainty level estimation unit 22 is a predetermined value or more and the sound detection unit 23 detects the predetermined sound, the operation determination unit 24 determines that the predetermined operation has been performed in the predetermined procedure. On the other hand, when the predetermined sound is not detected by the sound detection unit 23 while the certainty level estimated by the certainty level estimation unit 22 is the predetermined value or more, the operation determination unit 24 determines that the predetermined operation has not been performed in the predetermined procedure. The predetermined value is, for example, 80% or more and can be set to any appropriate value within a range that allows a determination to be made as to whether or not the predetermined operation has been appropriately performed.

Figure 4:
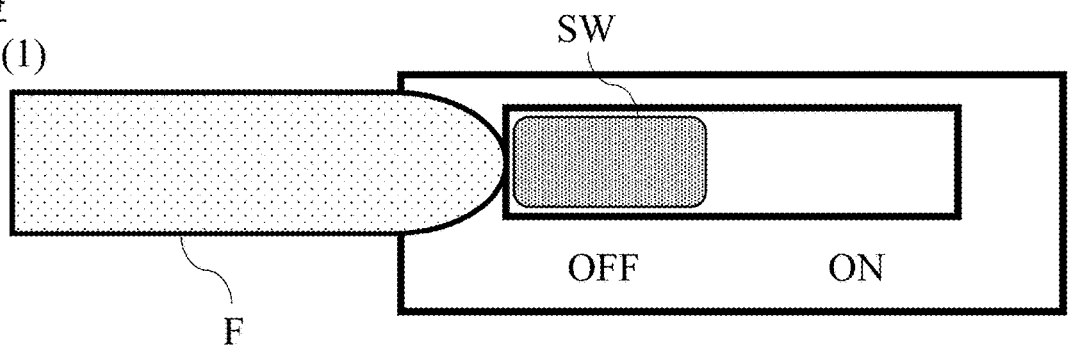
FIG. 4 is a set of explanatory diagrams illustrating an example of a predetermined procedure.
Figure 4:
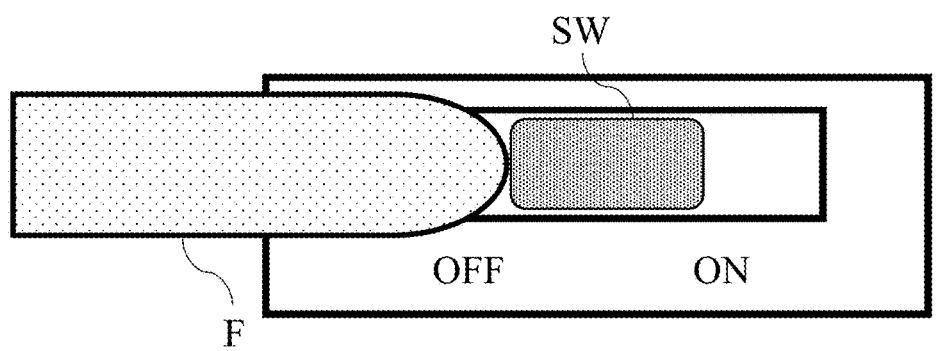
Figure 4:
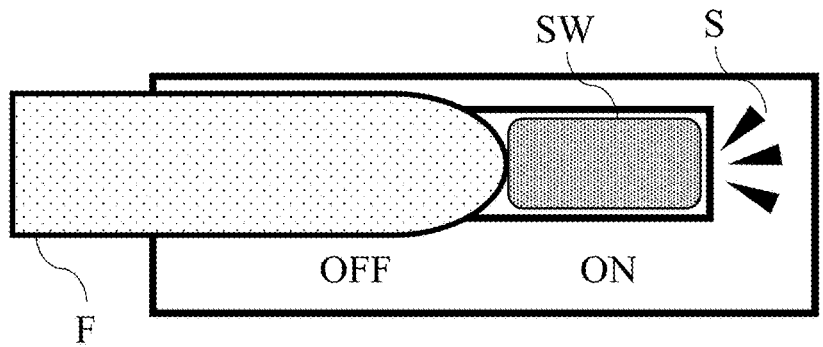
Figure 4:
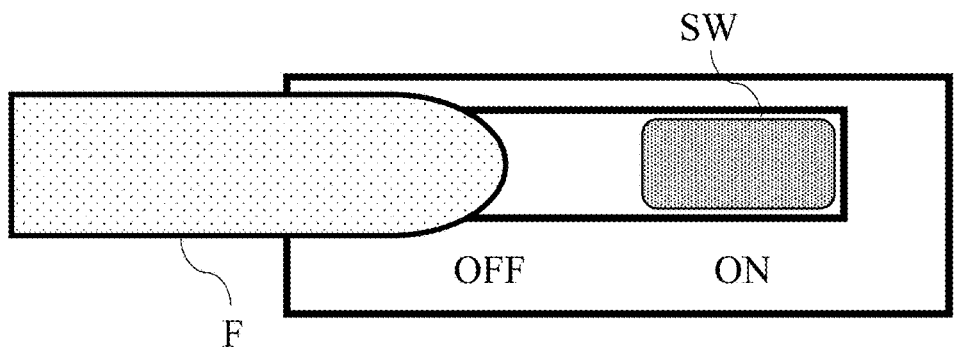

As an example, a case in which the predetermined operation is an operation of pressing a switch of a vehicle will be described with reference to FIG. 4. Switch SW illustrated in FIG. 4 turns the device ON and OFF, and when it is located on the left side in the horizontal direction of FIG. 4, it is in the OFF state, while when it is located on the right side, it is in the ON state. By pushing the switch SW with a finger F of the operator's hand, the switch SW can be switched from the OFF state to the ON state. As illustrated in FIG. 4, for example, the predetermined procedure in this case is a procedure comprising four steps: step 1) an occupant touches the switch SW with the finger F of the hand; step 2) the occupant pushes the switch SW in the ON direction with the finger F; step 3) the pushing operation is continued until the switch SW generates a clicking operation sound S; and step 4) the finger F is released from the switch SW when the operation sound S is generated. The operation determination unit 24 acquires the certainty level from the certainty level estimation unit 22 at predetermined time intervals and perceives a change in the detected motion together with the timing at which the certainty level becomes a predetermined value or more.

Figure 5:
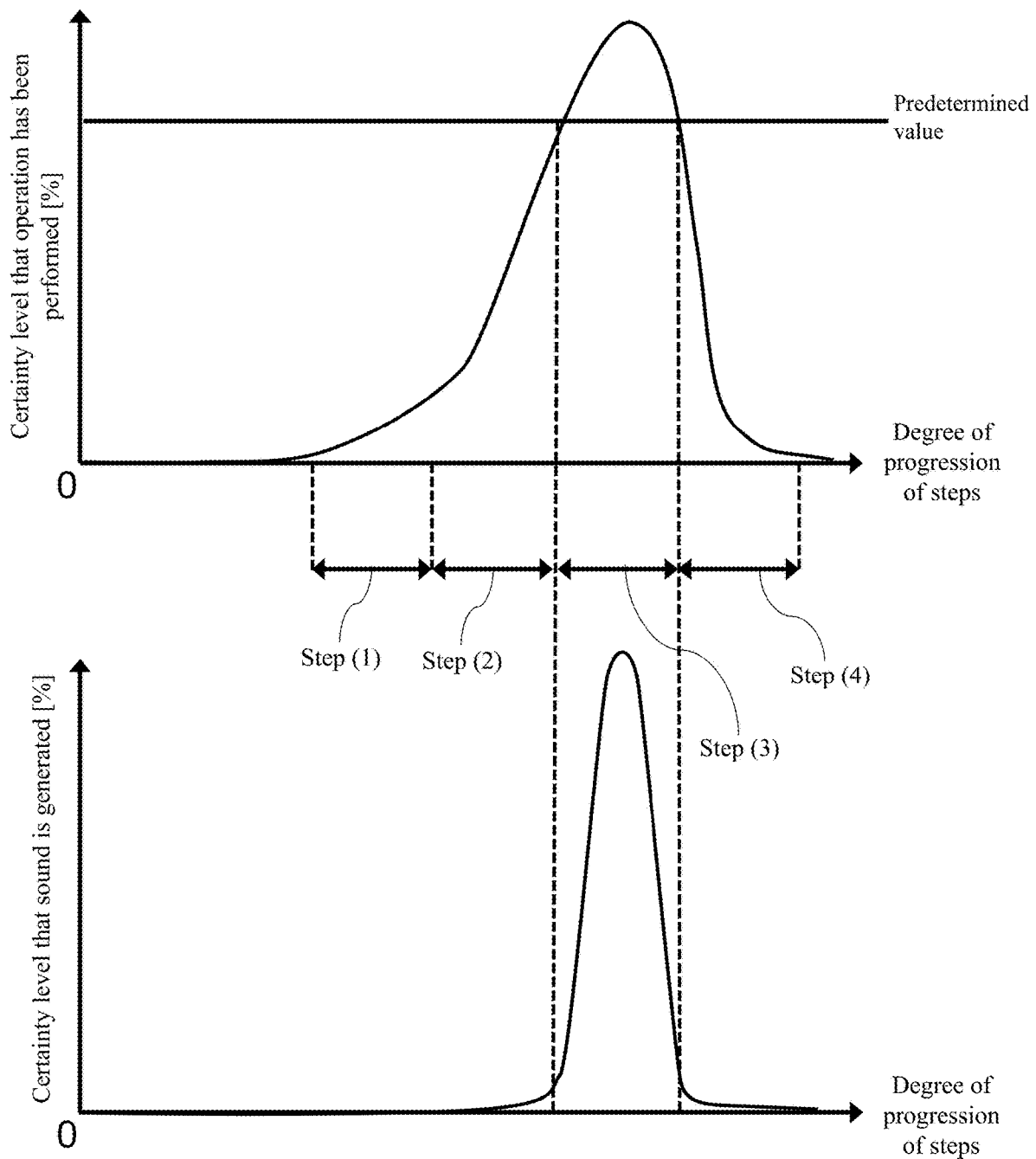
FIG. 5 is a graph illustrating the certainty level of having performed a predetermined operation with respect to the degree of progression of steps and the certainty level of generation of a predetermined sound with respect to the degree of progression of steps.

When the certainty level that an operation has been performed is plotted against the degree of progression of steps, for example, a graph as illustrated in the upper part of FIG. 5 is obtained. In this predetermined procedure, it is assumed that the certainty level becomes the predetermined value or more in step 3). The operation determination unit 24 determines whether or not the switch operation sound S, which is the predetermined sound, is detected while the occupant is performing the procedure of step 3), that is, while the certainty level is the predetermined value or more. When the certainty level that the predetermined sound is generated is plotted against the degree of progression of steps, for example, a graph as illustrated in the lower part of FIG. 5 is obtained. While the certainty level that the operation has been performed is the predetermined value or more, that is, during step 3), the certainty level that the switch operation sound S, which is the predetermined sound, is detected is high. In particular, while step 3) is being performed, the sound detection unit 23 analyzes the audio data acquired by the sound collection device 13 using a method such as frequency analysis and detects the switch operation sound S.

While the occupant is performing the procedure of step 3), when an output indicating that the predetermined sound has been detected is received from the sound detection unit 23, the operation determination unit 24 determines that the operation of pressing the switch of the vehicle has been performed according to the predetermined procedure. On the other hand, while the occupant is performing the procedure of step 3), when an output is not received from the sound detection unit 23 and the occupant proceeds to the procedure of step 4), the operation determination unit 24 determines that the operation of pressing the switch of the vehicle has not been performed according to the predetermined procedure. In other words, since the switch operation sound has not been detected in step 3), a determination is made that the switch has not been pushed to the position at which it operates properly and the occupant's switch input operation has not been performed appropriately.

Figure 6:
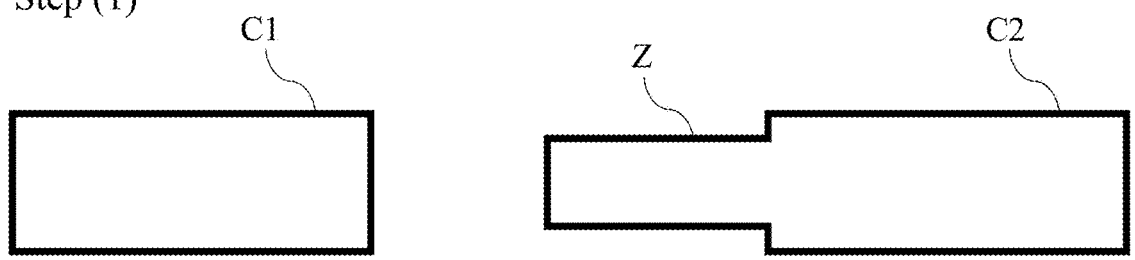
FIG. 6 is a set of explanatory diagrams illustrating another example of a predetermined procedure.
Figure 6:
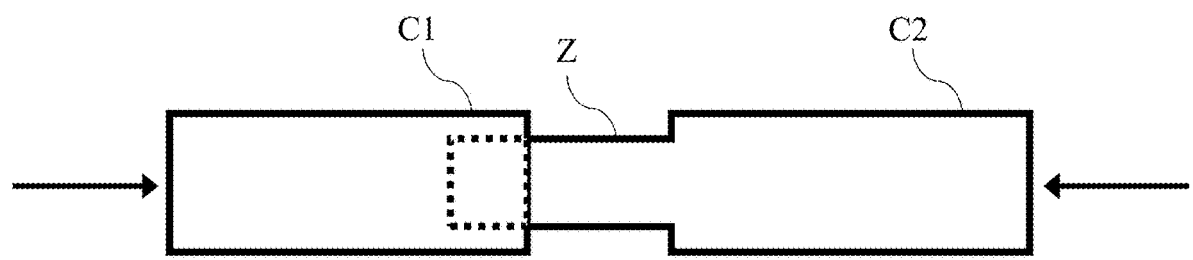
Figure 6:
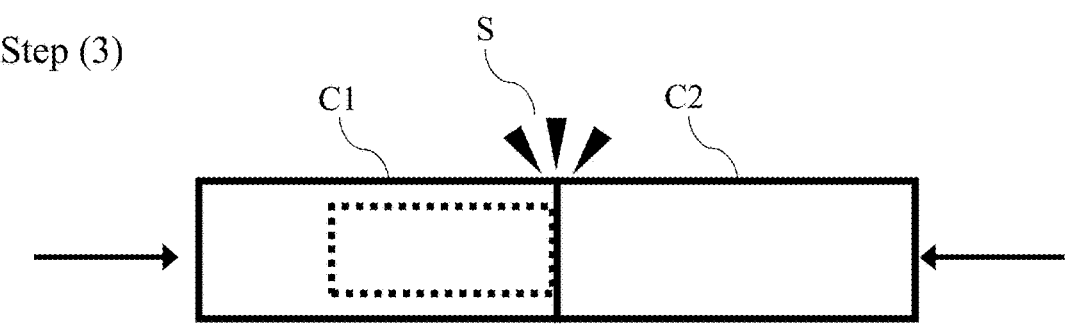
Figure 6:
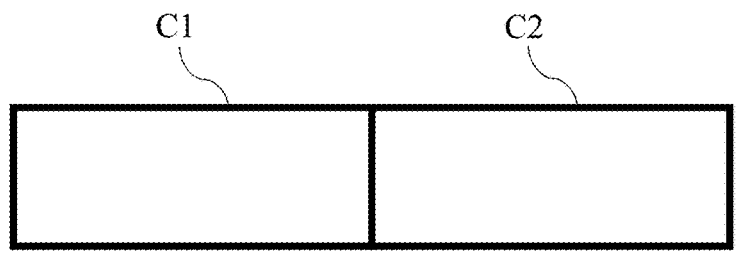

As another example, a case in which the predetermined operation is an operation for a worker to fit two couplers will be described with reference to FIG. 6. In FIG. 6, it is assumed that an operation sound is generated when a coupler C1 held in the worker's left hand and a coupler C2 held in the worker's right hand are fitted and the fitting portions of the coupler C1 and coupler C2 are properly fitted. As illustrated in FIG. 6, for example, the predetermined procedure in this case is a procedure comprising four steps: step 1) the worker holds the couplers C1 and C2 with the left hand and right hand, respectively; step 2) the worker combines the coupler C1 and the coupler C2; step 3) the worker pushes the couplers C1 and C2 to each other until fitting portions Z of the couplers are engaged to each other to generate a clicking operation sound S; and step 4) the hands are released from the couplers C1 and C2 when the operation sound S is generated.

Like the above-described example, the operation determination unit 24 acquires the certainty level from the certainty level estimation unit 22 and perceives the timing at which the certainty level becomes a predetermined value or more. In this predetermined procedure, it is assumed that the certainty level becomes the predetermined value or more in step 3). The operation determination unit 24 determines whether or not the switch operation sound S when the fitting portions of the couplers are engaged, which is the predetermined sound, is detected while the worker is performing the procedure of step 3), that is, while the certainty level is the predetermined value or more. While the worker is performing the procedure of step 3), when an output indicating that the predetermined sound has been detected is received from the sound detection unit 23, the operation determination unit 24 determines that the worker's operation of fitting the couplers C1 and C2 has been performed according to the predetermined procedure. On the other hand, while the worker is performing the procedure of step 3), when an output is not received from the sound detection unit 23 and the worker proceeds to the procedure of step 4), the operation determination unit 24 determines that the worker's operation of fitting the couplers C1 and C2 has not been performed according to the predetermined procedure. In other words, since the operation sound S of the fitting portions has not been detected in step 3), a determination is made that the couplers have not been pushed to the position at which they are properly engaged together and the coupler C1 and the coupler C2 have not been fitted appropriately.

The correspondence relationship between the predetermined procedure and the predetermined operation is no limited to a one-to-one relationship, and two or more predetermined procedures may be set for one predetermined operation.

Referring again to FIG. 1, the determination result output unit 25 has a function of outputting the determination result in the operation determination unit 24 to external equipment. In particular, the determination result output unit 25 has a function of, when the operation determination unit 24 determines that the predetermined operation has not been performed in the predetermined procedure, outputting the determination result that the predetermined operation has not been performed. The determination result output unit 25 outputs to the display device 14 the determination result that the predetermined operation has not been performed, and the display device 14 can display the determination result thereby to notify the operator of the determination result that the predetermined operation has not been performed appropriately. For example, when an operator is driving a bus and a supervisor who is controlling the operation of the bus is located in an operation control room located away from the bus driven by the operator, the display device 14 is provided in the operation control room, and the determination result output unit 25 outputs the determination result to the display device 14. This allows the supervisor to monitor the operating status of the bus at a location away from the operator and to confirm that the operator who is driving the bus operates the ventilator or air conditioner to appropriately control the temperature inside the bus.

Processing in Operation Detection System

Figure 7:
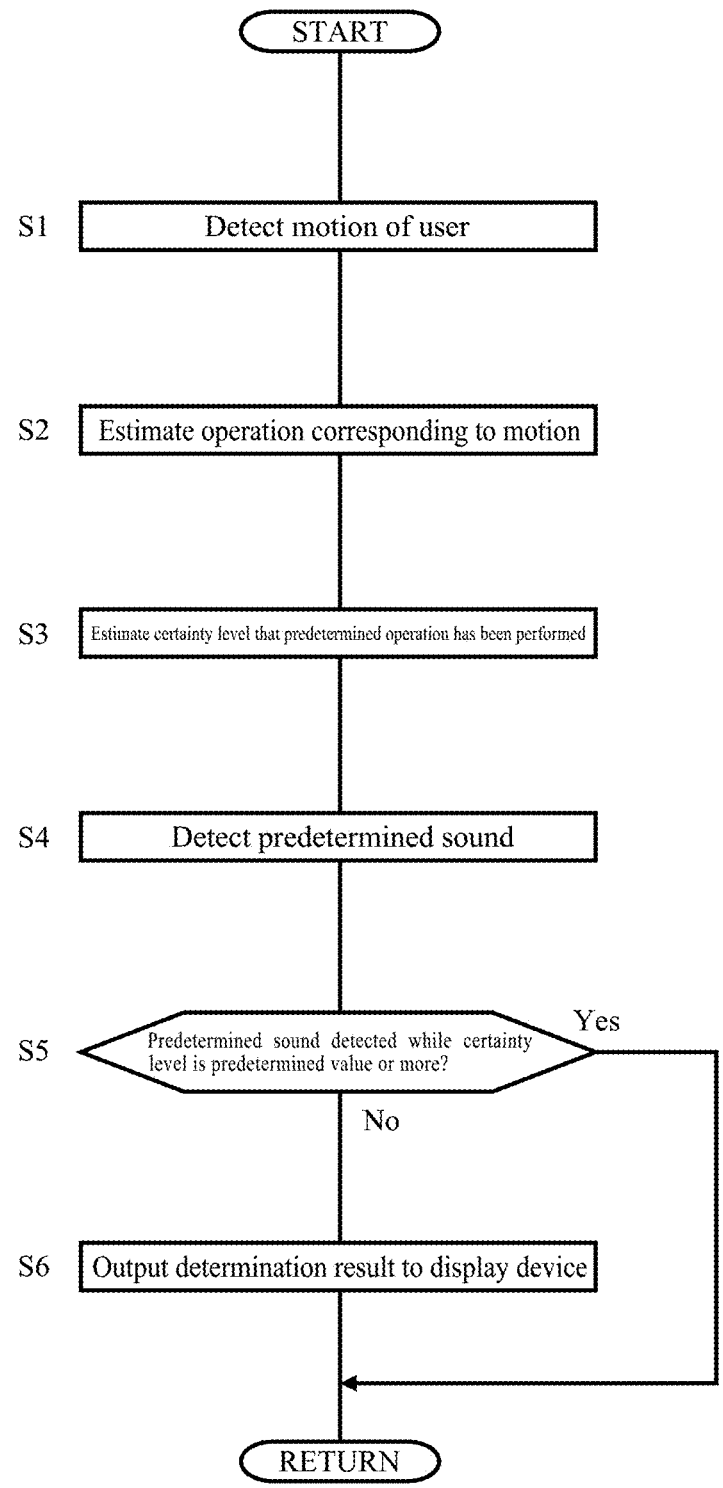
FIG. 7 is a flowchart illustrating an example of an information processing procedure in the operation detection system of FIG. 1.

With reference to FIG. 7, the procedure when the operation detection device 15 processes information will be described. FIG. 7 is an example of a flowchart illustrating information processing in the operation detection system 1 of the present embodiment. The processing described below is executed by the processor 16 of the operation detection device 15 at predetermined time intervals.

First, in step S1, the motion detection unit 21 uses its function to detect the motion of an operator. When a vehicle occupant operates an operator interface of onboard equipment, the motion of the occupant is detected, for example, from image data acquired by the imaging device 11 installed on the dashboard of the vehicle.

In subsequent step S2, the certainty level estimation unit 22 uses its function and the correspondence relationship between an operation and a motion, which is stored in the database 17, to estimate the operation that the operator is about to perform. When a vehicle occupant operates an operator interface of onboard equipment, the certainty level estimation unit 22 estimates the occupant's operation from the correspondence relationship between the operation and the motion based on the motion which is detected by the motion detection unit 21 using image data.

In subsequent step S3, the certainty level estimation unit 22 uses its function to determine whether or not the estimated operation corresponds to a predetermined operation, and when determining that the estimated operation corresponds to the predetermined operation, estimate the certainty level that the predetermined operation has been performed. For this estimation, the function between the motion and the certainty level stored in the database 17 is used. When a vehicle occupant operates an operator interface of onboard equipment, the certainty level estimation unit 22 estimates the certainty level that the operation on the operator interface has been performed from the function between the motion and the certainty level based on the motion which is detected by the motion detection unit 21 using image data.

In subsequent step S4, the sound detection unit 23 uses its function and the sound collection device 13 to detect a predetermined sound. In the case in which a vehicle occupant operates an operator interface of onboard equipment, the sound collection device 13 detects the operation sound generated from a speaker of the vehicle when the operator interface is operated.

In subsequent step S5, the operation determination unit 24 uses its function to determine whether or not the predetermined sound is detected by the sound detection unit 23 while the certainty level estimated by the certainty level estimation unit 22 is a predetermined value or more. When determining that the predetermined sound is detected by the sound detection unit 23 while the certainty level estimated by the certainty level estimation unit 22 is the predetermined value or more, the operation determination unit 24 determines that the operator has performed the predetermined operation, and stops execution of the routine to conclude the process of operation detection. On the other hand, when the predetermined sound is not detected by the sound detection unit 23 while the certainty level is the predetermined value or more, the operation determination unit 24 determines that the predetermined operation has not been performed in the predetermined procedure, and the process proceeds to step S6. In the case in which a vehicle occupant operates an operator interface of onboard equipment, when the operation sound generated from the vehicle's speaker is detected while the certainty level that the operator interface has been operated is a predetermined value or more, the operation determination unit 24 determines that the operation on the operator interface has been performed appropriately. On the other hand, when the operation sound generated from the vehicle's speaker is not detected while the certainty level that the operator interface has been operated is the predetermined value or more, the operation determination unit 24 determines that the operation on the operator interface has not been performed in the predetermined procedure.

In step S6, the determination result output unit 25 uses its function to output to the display device 14 that the predetermined operation has not been performed appropriately. Then, the display device 14 receives the output from the determination result output unit 25 and notifies the operator that the predetermined operation has not been performed appropriately. When a vehicle occupant operates an operator interface of onboard equipment, the operator interface displays that the operation has not been performed appropriately. After the display, execution of the routine is stopped and the process of operation detection is concluded.

As another example, when a vehicle occupant opens a sunroof or operates a ventilator, for example, in step S1, the motion of the occupant is detected from image data acquired by the imaging device 11 installed on the rear window glass of the vehicle. In subsequent step S2, the occupant's operation is estimated from the correspondence relationship between the operation and the motion based on the motion which is detected by the motion detection unit 21 using image data. In subsequent step S3, the certainty level that the operation on the sunroof or ventilator has been performed is estimated from the function between the motion and the certainty level based on the motion which is detected by the motion detection unit 21 using image data. In subsequent step S4, the sound of a sunroof opening/closing mechanism operating or the sound of the ventilator opening is detected. In subsequent step S5, a determination is made whether or not the sound of the sunroof opening/closing mechanism operating or the sound of the ventilator opening is detected while the certainty level that the sunroof or ventilator has been operated is a predetermined value or more. When the sound is detected, a determination is made that the operation on the sunroof or ventilator has been performed appropriately, and the process of operation detection is concluded. On the other hand, when the sound is not detected, a determination is made that the operation on the sunroof or ventilator has not been performed in the predetermined procedure, and the process proceeds to step S6. Then, in step S6, information indicating that the operation on the sunroof or ventilator has not been performed appropriately is outputted to the display device 14.

As still another example, when a worker engaged in assembly work at a factory tightens a bolt using a tool, for example, in step S1, the motion of the worker is detected from the myoelectric potential value acquired by the myoelectric potential measurement device 12 attached to the worker. In subsequent step S2, the worker's operation is estimated from the correspondence relationship between the operation and the motion based on the motion which is detected by the motion detection unit 21 using the myoelectric potential value. In subsequent step S3, the certainty level that the operation of tightening the bolt has been performed is estimated from the function between the motion and the certainty level based on the motion which is detected by the motion detection unit 21 using the myoelectric potential value. In subsequent step S4, the sound generated from the tool when the bolt is finished being tightened is detected. In subsequent step S5, a determination is made whether or not the sound generated from the tool is detected while the certainty level that the operation of tightening the bolt has been performed is a predetermined value or more. When the sound generated from the tool is detected, a determination is made that the bolt has been tightened appropriately, and the process of operation detection is concluded. On the other hand, when the sound generated from the tool is not detected, a determination is made that the bolt has not been tightened appropriately, and the process proceeds to step S6. Then, in step S6, information indicating that the bolt has not been tightened appropriately is outputted to the display device 14.

As yet another example, when a worker engaged in assembly work at a factory fits two couplers, for example, in step S1, image data is acquired by the imaging device 11 attached to the worker as a wearable terminal, and the motion of the worker is detected. In subsequent step S2, the worker's operation is estimated from the correspondence relationship between the operation and the motion based on the motion which is detected by the motion detection unit 21 using the image data. In subsequent step S3, the certainty level that the worker has fitted the couplers is estimated from the function between the motion and the certainty level based on the motion which is detected by the motion detection unit 21 using the image data. In subsequent step S4, the sound generated from the fitted portion when the couplers are fitted is detected. In subsequent step S5, a determination is made whether or not the sound generated from the fitted portion is detected while the certainty level that the operation of fitting the couplers has been performed is a predetermined value or more. When the sound generated from the fitted portion is detected, a determination is made that the couplers have been fitted appropriately, and the process of operation detection is concluded. On the other hand, when the sound generated from the fitted portion is not detected, a determination is made that the couplers have not been fitted appropriately, and the process proceeds to step S6. Then, in step S6, information indicating that the couplers have not been fitted appropriately is outputted to the display device 14.

Embodiments of the Present Invention

As described above, according to the present embodiment, the operation detection device 15 is obtained, comprising: a motion detection unit 21 that detects a motion of an operator; a certainty level estimation unit 22 that estimates, based on the motion of the operator detected by the motion detection unit 21, a certainty level that the operator has performed a predetermined operation; a sound detection unit 23 that detects a predetermined sound generated when the predetermined operation is performed; and an operation determination unit 24 that, when the certainty level estimated by the certainty level estimation unit 22 is a predetermined value or more and the predetermined sound is detected by the sound detection unit 23, determines that the operator has performed the predetermined operation. This allows the operator's operation to be detected without detecting the operator's touch position. Moreover, even when it is difficult to determine only from an image whether or not the operation has been performed appropriately, it is possible to determine whether or not the operation has been appropriately completed.

According to the operation detection device 15 of the present embodiment, the certainty level estimation unit 22 estimates the certainty level at predetermined time intervals. This allows more accurate certainty level to be estimated.

According to the operation detection device 15 of the present embodiment, the motion detection unit 21 acquires an image including the operator and detects the motion of the operator from the acquired image. This allows the motion of the operator to be detected without attaching any equipment to the operator.

According to the operation detection device 15 of the present embodiment, when the predetermined sound is not detected by the sound detection unit 23 while the certainty level is the predetermined value or more, the operation determination unit 24 determines that the predetermined operation has not been performed in a predetermined procedure. This allows the operation detection device 15 to recognize that the operation has not been performed according to the predetermined procedure.

According to the operation detection device 15 of the present embodiment, the determination result output unit 25 is provided, which, when the operation determination unit 24 determines that the predetermined operation has not been performed, outputs a determination result that the predetermined operation has not been performed. This allows the operator to be notified that the operation has not bee performed according to the predetermined procedure.

According to the operation detection device 15 of the present embodiment, the display device 14 is provided, which receives an output of the determination result output unit 25 and notifies the operator that the predetermined operation has not been performed. This allows the operator to be notified that the operation has not been performed according to the predetermined procedure.

According to the operation detection device 15 of the present embodiment, the predetermined sound is a sound generated due to the predetermined operation performed by the operator. This can narrow down the sounds to be detected by the sound detection unit 23, and the predetermined sound can be detected more accurately.

According to the operation detection device 15 of the present embodiment, the certainty level estimation unit 22 estimates the certainty level using a learned model that has undergone machine learning for estimating the certainty level from the motion of the operator detected by the motion detection unit 21. This allows the certainty level to be estimated for an operation that is not preliminarily set.

According to the operation detection device 15 of the present embodiment, the learned model is a neural network 3 having an input layer 31 and an output layer 33 and configured such that when input data including data on the motion of the operator detected by the motion detection unit 21 is input to the input layer 31, output data including data on the certainty level is output from the output layer 33, and the certainty level estimation unit 22 includes a machine learning unit that allows the neural network 3 to learn using as training data the input data input to the neural network 3 in past times and the output data output from the neural network 3 in past times. The machine learning unit allows the neural network 3 to learn. This allows the certainty level to be estimated more accurately for an operation that is not preliminarily set.

The operation detection method according to the present embodiment comprises: detecting a motion of an operator; estimating, based on the detected motion of the operator, a certainty level that the operator has performed a predetermined operation; detecting a predetermined sound generated when the predetermined operation is performed; and when the certainty level is a predetermined value or more and the predetermined sound is detected, determining that the operator has performed the predetermined operation. This allows the operator's operation to be detected without detecting the operator's touch position. Moreover, even when it is difficult to determine only from an image whether or not the operation has been performed appropriately, it is possible to determine whether or not the operation has been appropriately completed.

DESCRIPTION OF REFERENCE NUMERALS

1 . . . Operation detection system
   11 . . . Imaging device
   12 . . . Myoelectric potential measurement device
   13 . . . Sound collection device
   14 . . . Display device
      14*a* . . . Liquid crystal display
      14*b* . . . Earphone
   15 . . . Operation detection device
   16 . . . Processor
      161 . . . CPU
      162 . . . ROM
      163 . . . RAM
   17 . . . Database
2 . . . Operation detection unit
   21 . . . Motion detection unit
   22 . . . Certainty level estimation unit
      22*a* . . . Machine learning unit
   23 . . . Sound detection unit
   24 . . . Operation determination unit
   25 . . . Determination result output unit
3 . . . Neural network
   31 . . . Input layer
   32 . . . Intermediate layer
   33 . . . Output layer
   34 . . . Input data
   35 . . . Output data
   36 . . . Training data
C1, C2 . . . Coupler
F . . . Finger
OP . . . Operator
P . . . Part
S . . . Operation sound
SW . . . Switch
WB . . . Workbench
Z . . . Fitting portion

The invention claimed is:

1. An operation detection device comprising:
a motion detection unit that detects a motion of an operator;
a certainty level estimation unit that estimates a certainty level at predetermined time intervals based on the motion of the operator detected by the motion detection unit and acquires the certainty level with respect to a change in the motion, the certainty level indicating that the operator has performed a predetermined operation;

a sound detection unit that detects a predetermined sound generated from an operation object operated by the operator or an physical body accompanying the operation object when the predetermined operation is performed; and an operation determination unit that, when the predetermined sound is detected by the sound detection unit while the certainty level estimated by the certainty level estimation unit is a predetermined value or more, determines that the operator has performed the predetermined operation, and when the predetermined sound is not detected by the sound detection unit while the certainty level is the predetermined value or more, determines that the predetermined operation has not been performed in a predetermined procedure, wherein the certainty level estimation unit estimates the certainty level using a learned model that has undergone machine learning for estimating the certainty level from the motion of the operator detected by the motion detection unit, the learned model is a neural network having an input layer and an output layer and configured such that when input data including data on the motion of the operator detected by the motion detection unit is input to the input layer, output data including data on the certainty level is output from the output layer, and the certainty level estimation unit includes a machine learning unit that allows the neural network to learn using as training data the input data input to the neural network in past times and the output data output from the neural network in past times, wherein the machine learning unit allows the neural network to learn.

2. The operation detection device according to claim 1, comprising:

a determination result output unit that, when the operation determination unit determines that the predetermined operation has not been performed, outputs a determination result that the predetermined operation has not been performed.

3. The operation detection device according to claim 2, comprising:

a display device that receives an output of the determination result output unit and notifies the operator that the predetermined operation has not been performed.

4. The operation detection device according to claim 1, wherein the predetermined sound is a sound generated due to the predetermined operation performed by the operator.

5. An operation detection method comprising:

detecting a motion of an operator;

estimating a certainty level at predetermined time intervals based on the detected motion of the operator to acquire the certainty level with respect to a change in the motion, the certainty level indicating that the operator has performed a predetermined operation;

detecting a predetermined sound generated from an operation object operated by the operator or a physical body accompanying the operation object when the predetermined operation is performed;

when the predetermined sound is detected while the certainty level is a predetermined value or more, determining that the operator has performed the predetermined operation;

when the predetermined sound is not detected while the certainty level is the predetermined value or more, determining that the predetermined operation has not been performed in a predetermined procedure; and estimating the certainty level using a learned model that has undergone machine learning for estimating the certainty level from the motion of the operator, wherein the learned model is a neural network having an input layer and an output layer and configured such that when input data including data on the motion of the operator is input to the input layer, output data including data on the certainty level is output from the output layer; and learning the neural network using as training data the input data input to the neural network in past times and the output data output from the neural network in past times.

6. The operation detection device according to claim 1, wherein the motion detection unit acquires an image including the operator and a value of a myoelectric potential of the operator and detects the motion of the operator from the acquired image and the acquired value of the myoelectric potential.

7. An operation detection device comprising:

a motion detection unit that acquires an image including an operator and a value of a myoelectric potential of the operator and detects a motion of the operator from the acquired image and the acquired value of the myoelectric potential;

a certainty level estimation unit that estimates, based on the motion of the operator detected by the motion detection unit, a certainty level that the operator has performed a predetermined operation;

a sound detection unit that detects a predetermined sound generated from an operation object operated by the operator or a physical body accompanying the operation object when the predetermined operation is performed; and an operation determination unit that, when the certainty level estimated by the certainty level estimation unit is a predetermined value or more and the predetermined sound is detected by the sound detection unit, determines that the operator has performed the predetermined operation, wherein the certainty level estimation unit estimates the certainty level using a learned model that has undergone machine learning for estimating the certainty level from the motion of the operator detected by the motion detection unit, the learned model is a neural network having an input layer and an output layer and configured such that when input data including data on the motion of the operator detected by the motion detection unit is input to the input layer, output data including data on the certainty level is output from the output layer, and the certainty level estimation unit includes a machine learning unit that allows the neural network to learn using as training data the input data input to the neural network in past times and the output data output from the neural network in past times, wherein the machine learning unit allows the neural network to learn.

* * * * *